US005748956A

United States Patent [19]

Lafer et al.

[11] Patent Number: 5,748,956
[45] Date of Patent: May 5, 1998

[54] METHOD AND SYSTEM FOR MANAGING MULTIMEDIA ASSETS FOR PROPER DEPLOYMENT ON INTERACTIVE NETWORKS

[75] Inventors: John P. Lafer, Louisville; John E. Faust; Michael D. Williams, both of Boulder, all of Colo.

[73] Assignee: U.S. West Technologies, Inc., Boulder, Colo.

[21] Appl. No.: 372,157

[22] Filed: Jan. 13, 1995

[51] Int. Cl.$^6$ .................................................... G06F 17/00
[52] U.S. Cl. .......................... 395/615; 395/616; 395/619; 395/200.08; 395/200.19
[58] Field of Search ...................... 395/600, 619, 395/616, 615, 200.08, 200.19; 364/DIG. 1

[56] References Cited

U.S. PATENT DOCUMENTS

| | | |
|---|---|---|
| 5,297,253 | 3/1994 | Meisel ................................ 395/160 |
| 5,428,730 | 6/1995 | Baker et al. ........................ 395/154 |
| 5,473,680 | 12/1995 | Porter ................................. 379/201 |
| 5,487,167 | 1/1996 | Dinallo et al. ..................... 395/650 |
| 5,511,002 | 4/1996 | Mine et al. ..................... 364/514 R |
| 5,526,480 | 6/1996 | Gibson .............................. 395/154 |
| 5,557,790 | 9/1996 | Bingham et al. ................. 395/615 |
| 5,581,173 | 12/1996 | Civanlar et al. ................... 370/396 |

Primary Examiner—Thomas G. Black
Assistant Examiner—Jean R. Homere
Attorney, Agent, or Firm—Brooks & Kushman, P.C.

[57] ABSTRACT

A method is disclosed for automatically managing multimedia assets for use in a multimedia application. The method includes the step of storing a plurality of multimedia asset data files in the system memory. Next, the method includes automatically categorizing the multimedia asset data files. The method further includes the step of storing identifying information associated with each multimedia asset data file. The method concludes with the step of generating a set of multimedia application asset files based on the steps of categorizing and storing. A system is also disclosed for implementing the steps of the method.

8 Claims, 4 Drawing Sheets

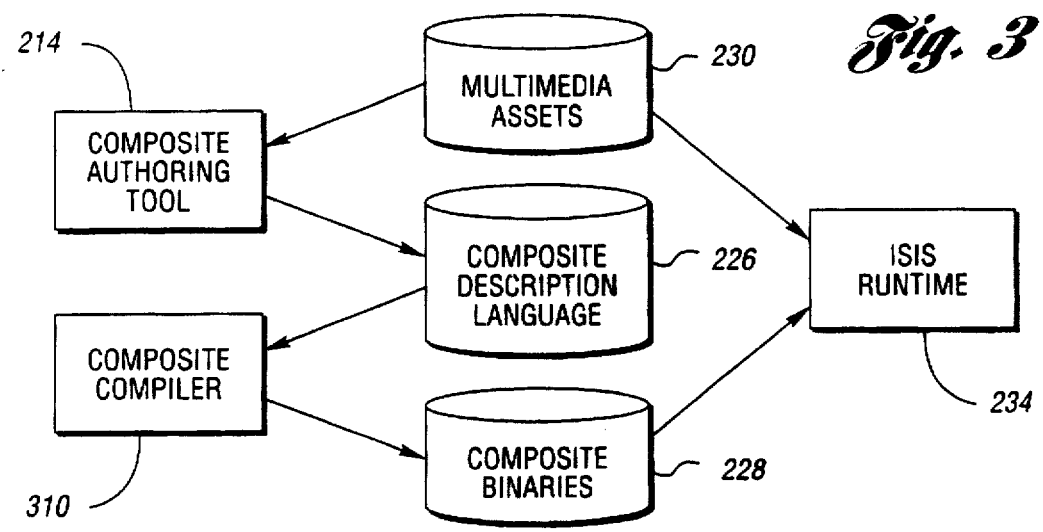
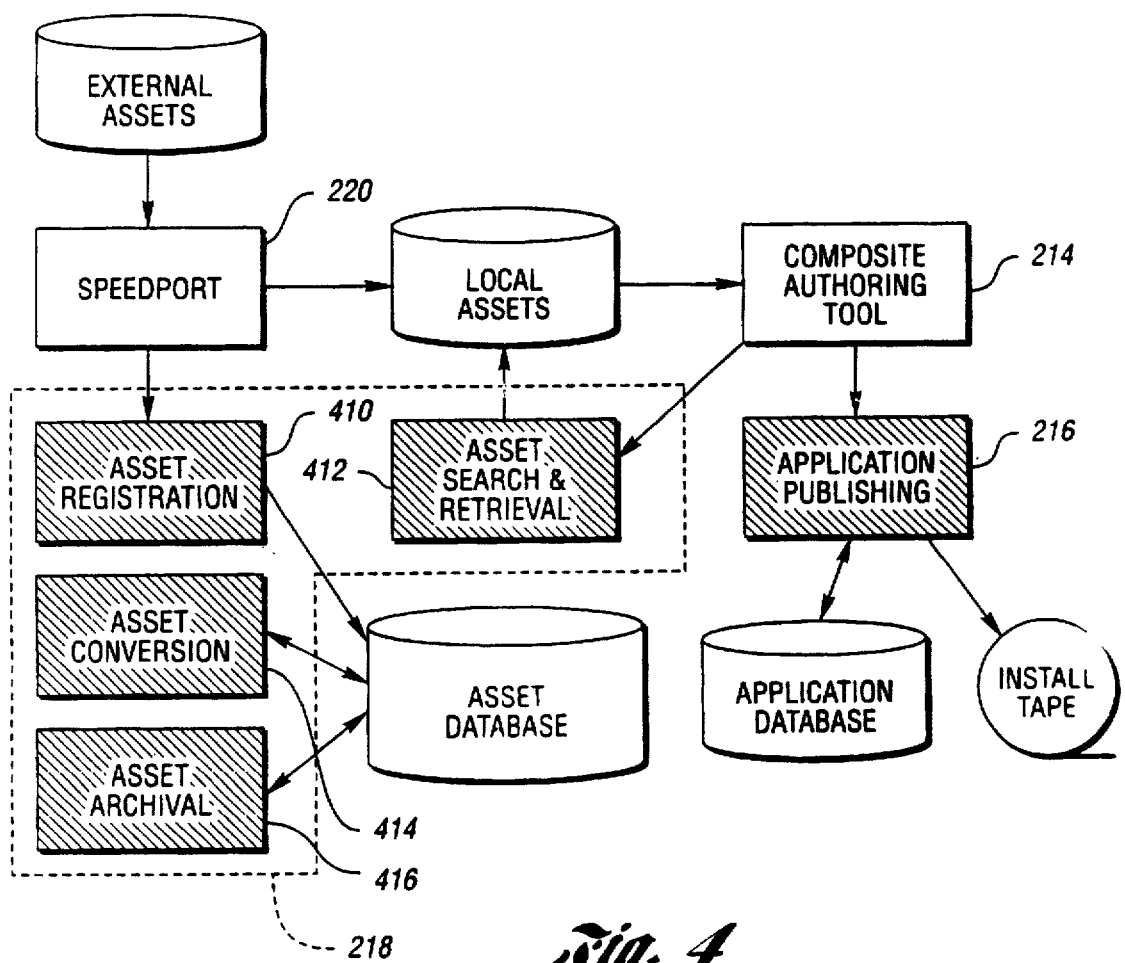

METHOD AND SYSTEM FOR MANAGING MULTIMEDIA ASSETS FOR PROPER DEPLOYMENT ON INTERACTIVE NETWORKS

CROSS-REFERENCE TO RELATED APPLICATIONS

This application is related to U.S. patent application Ser. Nos. 08/372,152, 08/372,153, 08/372,159 and 08/372,158, filed concurrently with the present application, respectively entitled "Method and System for Preloading Interactive Multimedia Applications", "Method For Automatically Collecting Semantic Event Data in an Interactive Network", "Method and System For Describing an Interactive Multimedia Application", and "Method and System For Developing Interactive Multimedia Applications", which are commonly assigned to the assignee of the present application, and which are hereby incorporated by reference.

TECHNICAL FIELD

This invention relates generally to methods for producing and managing multimedia assets.

BACKGROUND ART

Recently, there has been an increased variety of interactive networks, including broadband television and computer networks, being deployed. The increased variety of deployment networks creates a number of problems for multimedia application developers:

Each deployment network may require a unique set of media content components.

Large multimedia applications, due to the amount of electronic storage they require, take a lot of time and computer/network resources to manipulate.

Large multimedia applications deployed on varied network platforms require multiple versions of every discrete media element. Correctly identifying, distinguishing and associating these media assets during the development, testing and deployment processes is difficult but essential.

Large, complex broadband applications, must be built, tested, installed and updated in a highly controlled manner if they are to deliver high levels of availability and reliability.

DISCLOSURE OF THE INVENTION

In view of the prior art, a need exists for a method for managing and producing multimedia assets which supports deployment of assets on a variety of interactive networks.

It is an object of the present invention to provide a method for managing and producing multimedia assets which provides automated, incremental transformation and installation of multimedia assets on a variety of platforms.

It is another object of the present invention to provide a method for managing and producing multimedia assets which provides automated cataloging of multimedia assets through implicit file identification, duplicate file checking and file associations.

It is yet another object of the present invention to provide a method for managing and producing multimedia assets which verifies intellectual property rights associated with each multimedia asset.

In carrying out the above objects and other objects of the present invention, a method is provided for a method for automatically managing multimedia assets for use in a multimedia application.

The method begins with the step of storing a plurality of multimedia asset data files in the system memory. Next, the method includes automatically categorizing the multimedia asset data files.

The method further includes the step of storing identifying information associated with each multimedia asset data file. The method concludes with the step of generating a set of multimedia application asset files based on the steps of categorizing and storing.

In further carrying out the above objects and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 3 is a schematic block diagram illustrating the relationship between various file formats and the runtime component of a set top terminal;

FIG. 4 is a functional block diagram illustrating the relationship between components of the Asset Management and Production System of the preferred embodiment;

BEST MODES FOR CARRYING OUT THE INVENTION

Figure 1:
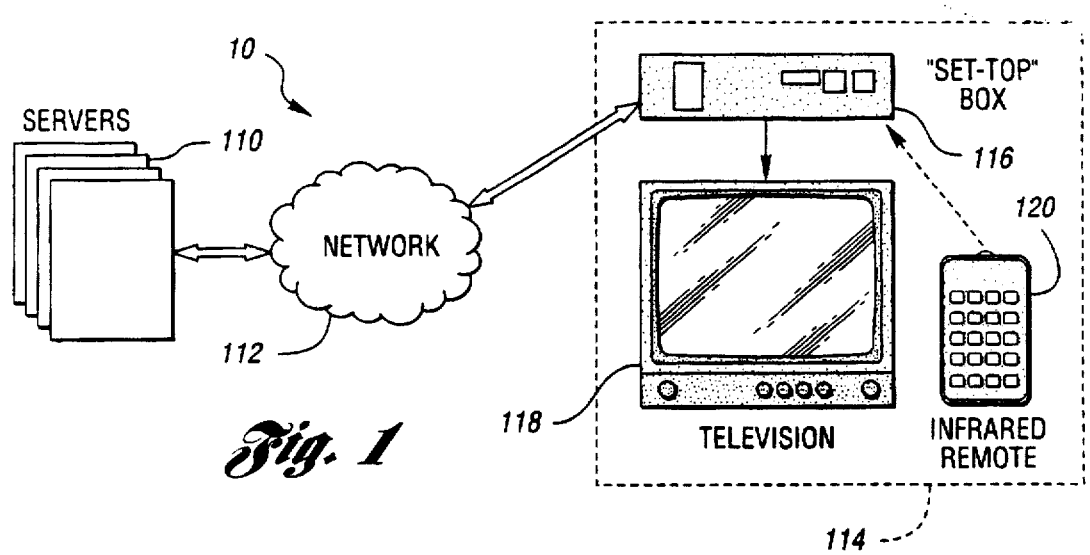
FIG. 1 is a schematic block diagram of the environment in which the present invention is used.

Referring now to the drawings, FIG. 1 is a schematic block diagram illustrating an interactive television ("ITV") system 10 for use with the present invention. System 10 includes at least one ITV server 110 for use with an ITV network 112. ITV server 110 is connected through ITV network 112 with client station 114.

There are a number of equipment manufacturers who produce commercially available equipment which could function as ITV server 110. In fact, the control logic employing the method of the present invention has been successfully implemented on DEC Alpha AXP processors running DEC OSF/1; SGI mips-based processors running IRIX; and SUN processors running SunOS.

The control logic has been implemented in both C and C++. If necessary, it could be easily ported to other UNIX platforms.

Client station 114 includes set top terminal 116, television 118 and remote controller 120. Preferably, set top terminal 116 would be either a Time-Warner full service network Home Communications Terminal ("HCT") or a 3DO set top terminal. The Time Warner HCT employs a MIPS R4000 chip running at 80–100 Mhz and incorporates Silicon Graphics Indigo Workstation components.

The 3DO set top terminal employs a proprietary 3DO chip set. The control logic communicating with the 3DO set top terminals conform to the 3DO RPC Folio, as described in the "3DO Network Developer's Guide—Preliminary Draft", dated July, 1994.

Both terminals, Time Warner and 3DO, are capable of receiving digital full-motion video, animation, graphics and audio data. Both terminals are further capable of converting this digital information into an analog signal for transmission to television 118.

Client station 114 further includes an input device 120. Preferably input device 120 is an infrared remote control including a number of alpha-numeric keys. Alternatively, input device 120 could be an infrared mouse.

As those skilled in the art will recognize, system 10 is an interactive television network employing a client-server architecture. ITV server 110 provides mass storage and services to client station 114. Control logic resides at both server 110 and client station 114 to support the client-server architecture.

Although the preferred server 110 and client station 114 are part of an interactive television system, the present invention is not limited to such an embodiment. For example, client station 114 could be a kiosk or personal computer without adversely affecting the utility of the present invention.

Figure 2:
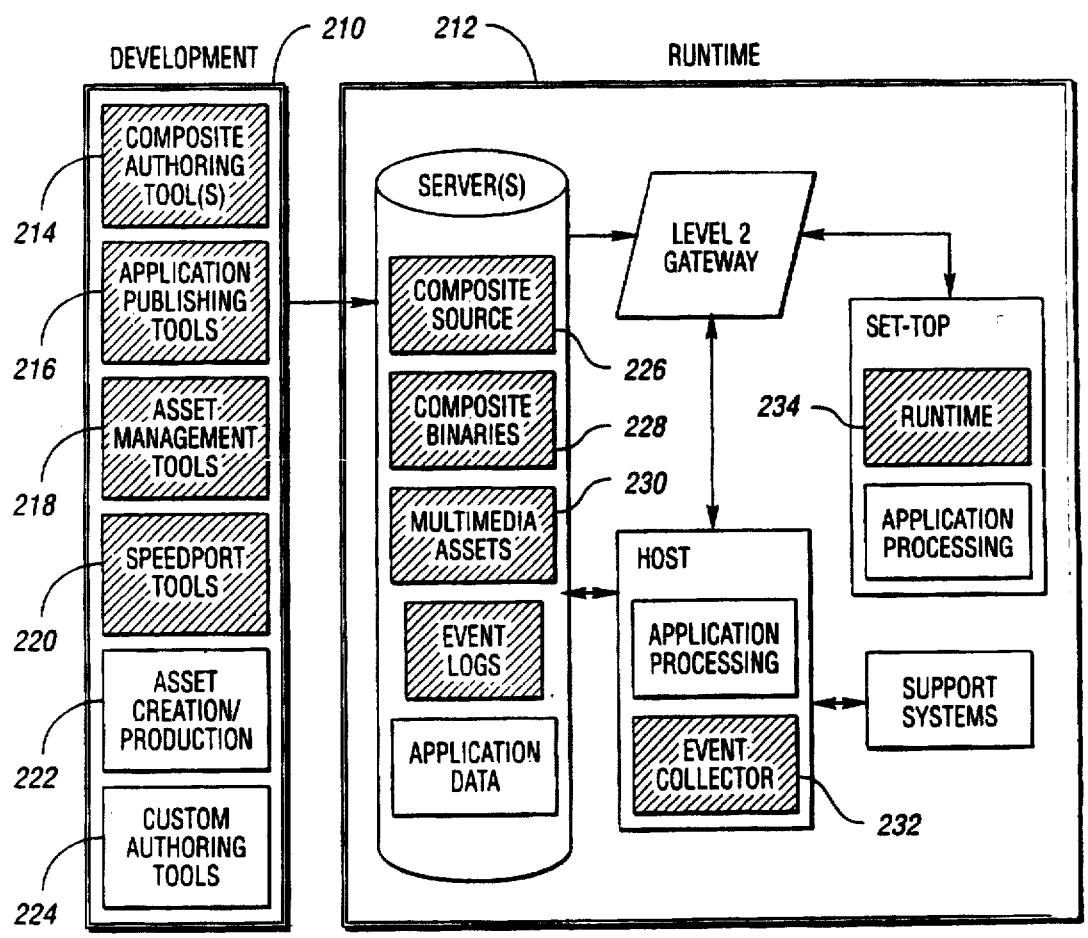
FIG. 2 is a schematic block diagram illustrating the preferred architecture of an interactive television network employing the development method of the present invention.

Referring now to FIG. 2, there is shown a schematic block diagram illustrating the architecture of the Information Services Infra-Structure ("ISIS") employing the application development method of the present invention. ISIS provides a set of interoperable software tools for developing and executing interactive multimedia applications for delivery on a variety of consumer electronic devices over a variety of broadband networks.

The ISIS architecture includes two categories of software components: development components 210 and runtime components 212. Development components 210 include authoring and application publishing tools for building a multimedia application.

The authoring tools work with existing asset creation and production tools such as Adobe Photoshop, Adobe Premier, and SoundEdit Pro which can be used to create videos, graphics, audio, and fonts. An authored application can be compiled and tested in either a standalone Macintosh configuration or a client/server environment over a network. The application publishing tools move the application from a standalone environment to a server environment and to the eventual deployment/production environment.

The ISIS Runtime components 212 are responsible for executing an authored application. ISIS runtime 212 provides the execution environment for the application in a client/server environment where the client device is a consumer set top terminal. In order to support emerging consumer set top terminals, as well as Macintoshes and PCs, the developed applications are portable.

The initial focus of ISIS was to deliver 3DO Runtime software for the U S WEST Broadband network trial in Omaha, Nebr., in the fourth quarter of 1994. A Macintosh version of the runtime components is also supported to allow testing of applications without expensive 3DO or DEC development hardware and software.

Composite Authoring Tool (CAT)

Referring now to FIG. 3, there is illustrated the relationship between CAT 214, Composite Compiler 310, various file formats and the ISIS runtime component 234 of set top terminal 114. CAT 214 is an authoring tool that runs on the Macintosh and defines the compositing of multimedia assets (i.e. video, graphics, audio, and text) into interactive multimedia applications. CAT 214 provides an integrated graphical layout editor, a forms editor, and a testing environment.

With the layout editor, display objects can be easily defined and laid out in a window that represents a television screen. Each display object also has a detail forms window in which additional object attributes can be specified.

CAT 214 provides a seamless testing environment on the Macintosh which is integrated with a composite compiler and the Macintosh version of the Runtime. CAT 214 invokes composite compiler 310 to compile the composite, and then invokes ISIS runtime 234 to execute the composite. A new composite can be created and tested with a few clicks of the mouse.

CAT 214 delivers a source composite definition 226 and a binary composite definition 228 as output in composite description Language ("CDL"). CDL provides an event driven, object oriented syntax for defining a multimedia application.

CDL source is stored in ASCII format, which makes it easy to read by any program that can read ASCII text files. CDL source files can be generated by CAT and edited by custom built authoring tools or any editor capable of handling ASCII text files.

Composite compiler 310 converts CDL from a source format into a more compact binary format. ISIS runtime 234 then reads and executes the instructions of the application in this binary format.

Composite compiler 310 includes a composite optimizer which condenses multiple composite files and assets referenced by the composite to a single composite binary file. Reducing the number of physical files within the application reduces the number of file accesses the ISIS Runtime must perform to execute a composite. File accesses are expensive, especially in a network environment because of network latency.

Composites, composite items, events, actions, and templates are the building blocks of CDL and any application built in ISIS.

Composite

A composite is a collection of assets, events and actions assembled into a "scene" that the ISIS Runtime 212 plays back. Composites can also contain other composites. To describe interactivity, a composite defines how to handle external events such as button presses on a remote control.

Composite item

A composite item is a multimedia object (i.e. video, graphic, text, audio, animation or custom library) within a composite. Attributes such as screen location, transparency and audio and video looping further define composite items.

Event

An event is an occurrence to which an application must react. Events can occur externally or internally to the ISIS Runtime. Button presses on a remote control are external events. The passage of time, entering a composite and starting a stream are internal events.

As ISIS Runtime 212 plays back a composite, it also monitors events as they occur. When an event occurs that is of interest to the executing composite, the ISIS Runtime 212 executes the actions associated with that event. An event always has at least one action associated with it.

Action

CDL has predefined actions that the ISIS Runtime player can perform. For example, a common action for composite items is "enable." The enable action tells the ISIS Runtime to display a graphic, play an audio file, etc.

Another common action is "transition to:composite" which tells the ISIS Runtime to execute the composite defined by the "transition to" action. In effect, these transitions link composites together into an application. In addition to the predefined actions that ISIS provides, a developer can write and add custom actions.

Composite Templates

Composites can also be templates. Any composite can take its composition from another composite simply by referencing that composite as a template. Composites inherit (using a delegation mechanism) all items, events, and actions from a template.

Application Publishing

The ISIS application publishing tools 216 are utilities that move an application between test environments and the deployment environment. These tools move all the objects of an ISIS application including composites, video, graphic and audio files, fonts, and custom code.

Application publishing tools 216 examine composite descriptions, determine all the files that support the composites, and move the application to a staging area such as tape or disk. From the staging area, the application can be moved to a variety of environments.

ISIS also supports incremental publishing. Using incremental publishing, only those objects that have been altered since the last publishing of the application are moved. This lets the developer add new features and change content quickly.

Asset Management and Production System (AMPS)

The ISIS Asset Management and Production System (AMPS) 218 provides a set of tools for managing multimedia assets 230 and ISIS applications. AMPS 218 provides multimedia title developers with an easy and convenient way to catalog assets, perform keyword searches on assets, archive assets and publish applications. AMPS 218 moves applications and assets from development environments to the deployment environment.

AMPS was originally designed to satisfy the following functionality goals of prospective ISIS information providers:

facilitate the porting of applications to different computer/network platforms protect media content from loss or damage allow multimedia applications to scale up facilitate media asset re-use support reliable updating and installation of applications provide easy access to assets by artists and multimedia technicians operating in a distributed work environment protect against the violation of copyright and license agreements To accomplish these goals, AMPS provides the following functionality:

library of assets and applications asset search engine asset converters asset backup and recovery asset archiving application configuration application installation 3rd-party tool interfaces The AMPS components are integrated with other ISIS components in the following areas:

library assets can be dragged from the asset search screen and dropped on the CAT authoring tool SpeedPort, the toolset for porting existing applications to ISIS, can invoke the asset registration screen for cataloging assets into the library the authoring of media assets into composites by the ISIS Composite Authoring Tool (CAT) and other CDL-compliant authoring tools is recorded in the AMPS application database Referring now to FIG. 4, there is a functional block diagram illustrating the relationship between components of AMPS 218 of the preferred embodiment.

Asset Registration

Asset registration 410 allows the developer to identify and catalog an asset or group of assets with AMPS 218. The developer can also assign keywords to the asset during the registration process. The developer can register assets manually using asset registration screens. Speedport 220 also uses the asset registration function to allow the developer to register assets in an automated fashion.

Asset Search and Retrieval

The asset search and retrieval function 412 allows the developer to perform keyword searches of the asset database. Asset retrieval supports the browsing of assets and/or using the asset within a multimedia application.

CAT 214 integrates with the asset search and retrieval function 412, providing the developer an easy and convenient way to locate assets during the authoring process. CAT 214 can also save composition definitions to the application database. This save operation invokes the AMPS asset tracking function which records the assets authored into each composition. CAT 214 can also invoke the application configuration function which supports the versioning and grouping of composites into "projects."

The AMPS asset tracking function records the assets authored into each composite. This provides the low level configuration information needed to: validate copyrights for an application, correctly install a composite and its assets on a deployment platform and perform impact analysis when assets need to be changed or removed from the database.

Asset Conversion

Multimedia assets come in many different formats. Audio, video, pictures, animations and fonts each have a variety of formats—many of which are hardware dependent. The ISIS asset conversion tools 414 convert assets from one format to another as specified by the conversion process. A wide variety of formats are supported, including virtually all of the more commonly used formats today.

In general, the runtime platform requires assets to be in a certain format. For example, 3DO supports a graphic format unique to the 3DO environment, called a CEL. The asset conversion tools 414 convert assets from a wide variety of formats into 3DO CELs.

Conversions can be run against a single asset or in batch against multiple assets. The converted asset is automatically registered with AMPS 218 as a new version.

Asset Archival

Asset archival 416 performs backup and recovery of assets. Asset archival 416 also moves assets off of faster magnetic disk devices to slower devices such as magnetic tape.

The archival of assets to slower devices provides significant cost benefits while still making the asset available to users of the system. Users are still able to perform keyword searches and view thumbnails on the archived asset. If the user wants to use the archived asset and it has been archived to a mounted device, AMPS 218 copies the asset back to disk. Otherwise, AMPS 218 notifies the user as to the location of the asset.

AMPS 218 also performs backup and recovery of assets to magnetic tape allowing the user to recover a previous version of an asset or restore an asset which may have been accidentally deleted.

Speedport Tools

Speedport 220 is a component of the ISIS tool set that transforms existing multimedia applications into ISIS applications. Speedport 220 provides tools to systematically extract multimedia assets from existing titles and to register those assets with AMPS. Speedport 220 also provides a methodology and practical guidance for converting the application into an ISIS application.

Speedport 220 speeds up the conversion of any existing multimedia application. Speedport 220 accepts a variety of digital media including CD-ROM, magnetic disk, optical drives, and digital tape.

Speedport 220 also defines a methodology or set of practices for porting application to the ISIS environment. This methodology guides the developer through the steps of moving application components from the existing environment into ISIS.

When performing asset extraction, Speedport 220 first searches the existing application and identifies multimedia assets from the set of files input to Speedport 220. This includes a variety of graphic, audio, and video file formats.

Next, Speedport 220 converts and renames the assets into a format usable by CAT 214 and the Macintosh runtime module. Speedport 220 then registers both the source and converted asset with AMPS 218. Finally, Speedport 220 generates reports identifying assets extracted by type and a list of unknown types.

Asset Concepts, Comparables and Instances

Figure 6:
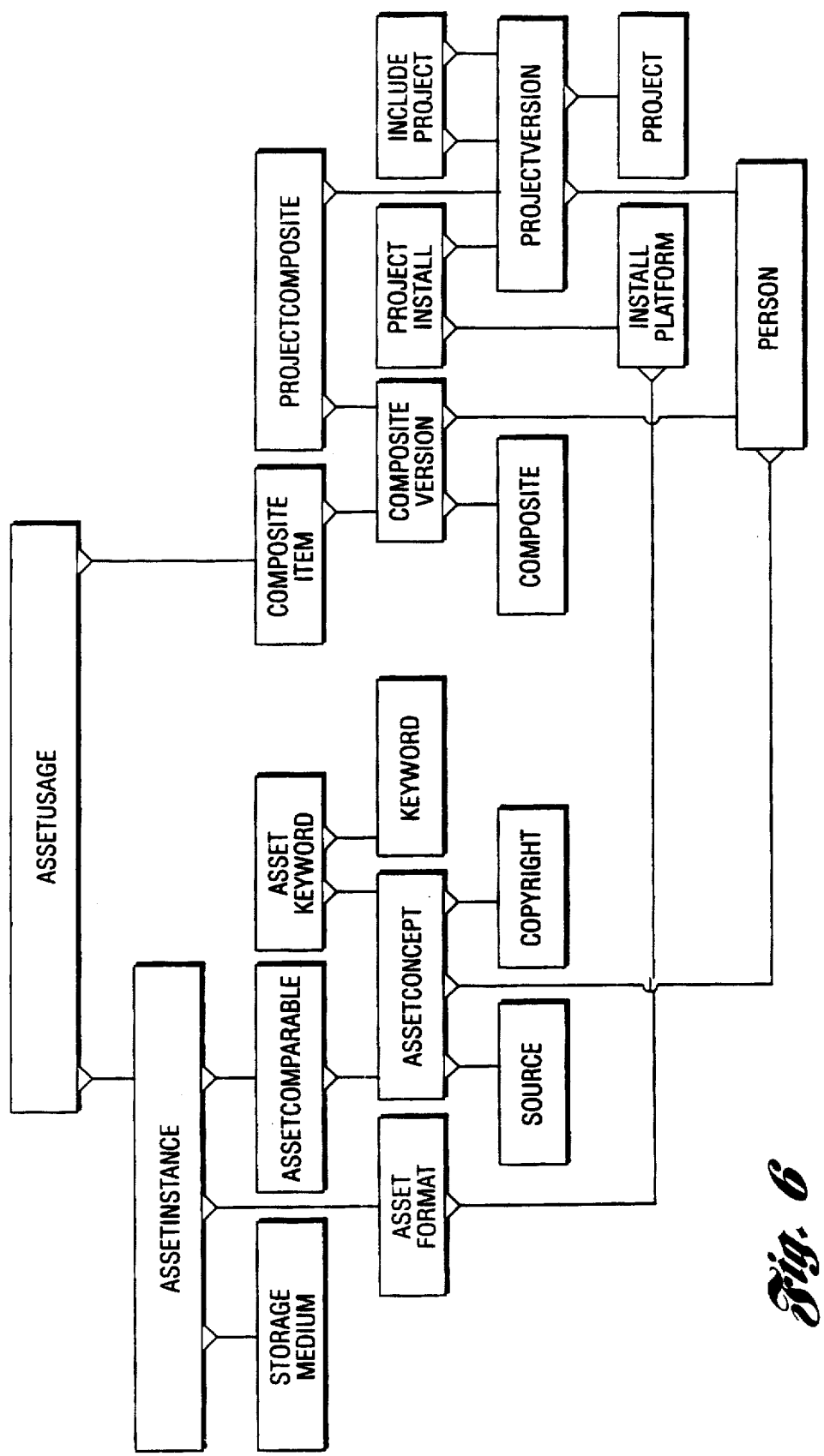
FIG. 6 is a block diagram illustrating the logical data model supporting the functions of AMPS.

Referring now to FIG. 6, there is shown the logical data model that supports the functions of AMPS.

One important feature of the model is the distinction between an "asset concept" which is a very abstract representation of a media asset, and an "asset instance" which is a specific media file that implements the media asset. In between the two is the moderately abstract "asset comparable."

An asset concept represents the essence of a media asset—a group of asset comparables, all derived from the same source asset, which differ only by subtle artistic variation (e.g. brightness, tint, contrast, high-end clipping). It is a reference to a media asset with the precision that allows one to describe the content, copyright, length, sequence, planned usage, etc., but not the specific artistic version nor the physical format and properties.

An asset comparable represents a specific artistic variation on an asset concept—a set of asset instances, all identical from an artist's viewpoint, which differ only in their file format, electronic representation, resolution, sampling rate, etc. It is a reference to a media asset with the precision that allows one to distinguish between a high- and low-contrast version of a picture, for example. The fundamental reason for asset comparables is to group all assets that are highly similar.

An asset instance represents a specific asset file—an instance of an asset comparable whose specific physical file properties make it suitable for presentation on specific deployment and authoring platforms. It is a reference to a media asset with the precision that allows one to properly install and present the asset on a specific platform. It is the level at which an author designates the quality level (e.g. bit rate, color depth) at which the asset should be presented (if possible) in a composite. One copy of every asset instance will be tracked.

Project Versions

When an ISIS composite source undergoes editing, it requires version control. The same is true of ISIS application projects which require configuration management to precisely define the mix of source components that can be built, tested and installed together as a unit. In the model, project versions are associated with a set of composite versions, and via their sub-project hierarchy, the composite versions associated with their sub-projects.

Installation Platforms

The installation platform entity represents an ISIS-supported runtime platform. Each platform can be associated with a set of project (versions). This association, project installation, records the set of projects currently installed on each platform. It allows the application installation function to incrementally build and install a new (or old) release of a project, by comparing the new release with the installed release. Associated with a platform is a set of valid asset formats which can be presented effectively on that platform.

Asset Usage

The asset usage entity records the authoring of assets into composite items. This association provides the data needed by the application installation function to install the correct set of assets when installing a composite.

Standard Facilities

The ISIS development environment 210 finally includes an interface to standard facilities such as asset creation/production 222 and custom authoring tools 224.

Asset Identification

One of the more challenging aspects of asset management is the task of identifying media assets. Asset identification means "attaching" data to every asset entering the system so that one can easily and efficiently:

detect and prevent or eliminate duplicate assets within the system distinguish between different assets find assets in the system The challenge stems from the fact that media assets are inherently hard to classify, uniquely identify and describe. Unlike bank accounts, people and purchase orders, they tend to take on many variations, versions and uses. In addition, it can be difficult to permanently attach identifying information to some assets and certainly difficult to do it in a consistent manner across platforms.

Finally, the processes and people who create media assets do not lend themselves to rigorous identification of assets. It is fair to say that there is some resistance to disciplined identification procedures on the part of the artists who generally are under time and budget constraints. The implication is that any identification scheme must be easy to use and non-intrusive to asset production processes.

Historically, assets have been identified with O/S-level file names. This solution does not scale well past a couple dozen assets, perhaps a couple hundred depending upon the file naming convention. It also does not scale to organizations that divide the asset production, post-production and authoring tasks among different individuals and teams. Different individuals due to the differing nature of their work and the different groups of assets with which they work, need different identification schemes. Thus, any identification scheme based upon file names quickly breaks down.

The AMPS system uses the following scheme for asset identification:

File names are NOT used for identifying assets and artists will be free to name files according to their own tastes and needs. The AMPS system will rely on a series of unique, system-assigned identifiers and keywords to identify assets.

Every asset concept will be assigned a permanent, unique identifier in the database. In addition, it will have a description and as many keywords as necessary to describe the concept behind the asset.

Every asset comparable will be assigned a permanent, unique identifier in the database. In addition, it will have a notes field to describe the artistic variation of the asset.

Every asset instance will represent one asset file. The asset instance will be assigned a permanent, unique identifier in the database. This identifier along with the associated asset comparable and asset concept identifiers will be attached to the actual file in the library storage system. For Mac files, these identifiers will be stored in a string resource item in the resource fork of the file. For UNIX and DOS files, no firm decision has been made at this time. However, it is envisioned that a scheme deploying hidden, "shadow" files which play the role of the Mac resource fork will be used.

When an asset file is catalogued in AMPS, the asset registration function will attempt to detect a duplicate file by looking at: asset identifiers in the resource data for the file, file size and format. Additional checks may be added in the future such as bit hashing.

AMPS will provide searching on keywords, file type, asset identifiers, source and other business data to support finding files. For visual assets, AMPS will extract, store and present a "thumbnail" view of the asset. This thumbnail can facilitate finding assets from a "hit list" or browse screen. Finally, the system will give visibility to the existence of related asset comparables. One can also see the various instances of an asset when specific file formats are needed. All of these functions are provided by the asset search function and can be used by any ISIS tool.

ISIS Runtime

A major component of the ISIS runtime environment 212 is the ISIS runtime module 234 which resides at client station 114. ISIS runtime 234 reads and plays back composite binary files 228 defined during the authoring process. It reads the startup composite, waits for events to occur, and then executes the actions associated with those events.

There are three major processing components of ISIS runtime module 234: the player; the preloader and the event collector.

As the heart of the Runtime, the player handles the display and playback of composite items, monitors and handles events as they occur, per forms actions, and communicates with the preloader and event collector as needed.

The preloader provides the ISIS runtime 234 with an overall memory management and caching scheme whose purpose is to improve performance and to hide latency. When an application s tarts and the player invokes the first composite, the preloader retrieves all of the files necessary to play the composite. It then looks at the composite and loads the "next" composites based on the transitions defined in the composite that is playing.

The event collector stores all internal and external events, as they occur, in a buffer in memory at client station 114. These events can be sent to the event collector 232 on the server for logging to a file or for additional processing.

The event collector captures the event information in enough detail so that ISIS Runtime 234 can use the event logs to play back an application session exactly as it appeared to the end user. ISIS runtime 234 is both compact and portable. Currently the total size of ISIS runtime 234 is approximately 200 KB.

Figure 5:
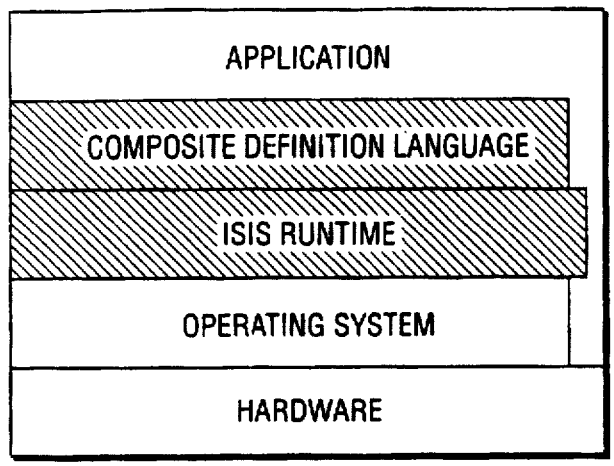
FIG. 5 is a block diagram illustrating the layered architecture employed by the preferred embodiment.
Figure 7:
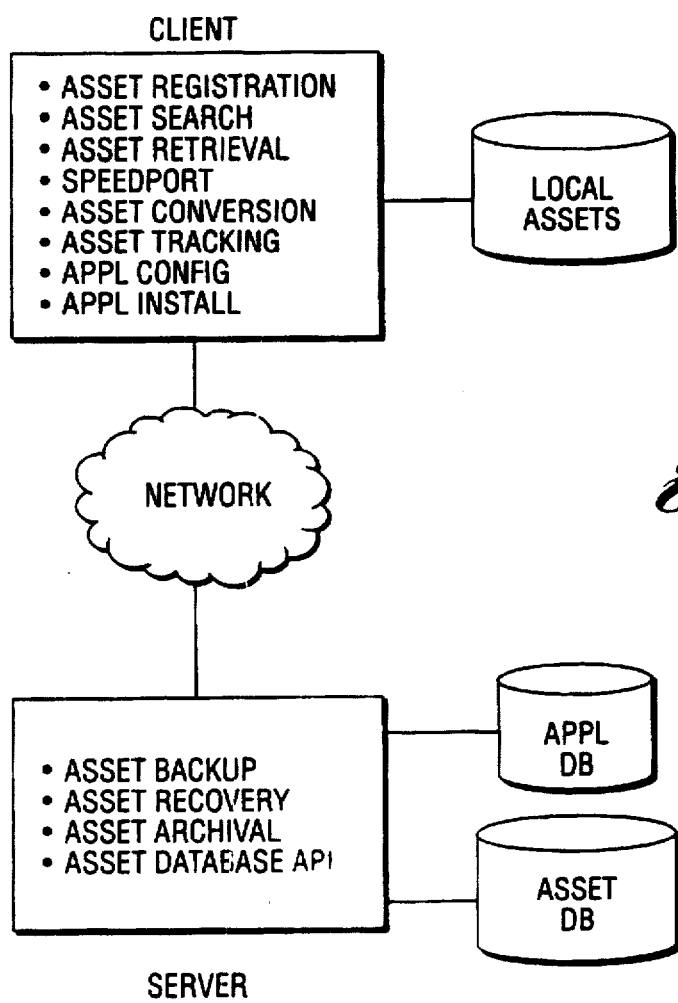
FIG. 7 is a functional block diagram illustrating the hardware responsible for each AMPS function.

Applications developed using the ISIS development environment 210 are easy to port to any client station equipped with ISIS runtime 234. ISIS accomplishes this by providing the layered architecture shown in FIG. 5.

Applications written in CDL are hidden from the details of the hardware, operating system software, and ISIS runtime. Even if ISIS runtime running on a client station with which the developer is unfamiliar, the CDL portion of the application runs without any changes.

There are other pieces of the application, however, that might require changes in order to execute on different client stations. The changes might include reformatting and re-encoding assets and converting fonts.

While the best mode for carrying out the invention has been described in detail, those familiar with the art to which this invention relates will recognize various alternative designs and embodiments for practicing the invention as defined by the following claims.

What is claimed is:

1. In an application development computer system, a method for automatically managing multimedia assets for use in a multimedia application requiring compatible versions of the multimedia assets for proper deployment on different installation platforms, the method comprising:

storing a plurality of multimedia asset data files, wherein the plurality of multimedia asset data files include asset concepts, asset comparables, and asset instances;

automatically categorizing each one of the plurality of multimedia asset data files as an asset concept, an asset comparable, or an asset instance;

assigning an asset concept identifier which includes a unique identifier and a concept description to each asset concept;

assigning an asset comparable identifier which includes a unique identifier and a concept variation description to each asset comparable;

assigning an asset instance identifier which includes a unique identifier, the associated asset concept identifier, and the associated asset comparable identifier to each asset instance;

storing identifying information including the asset concept identifiers, the asset comparable identifiers, and the asset instance identifiers associated with each one of the plurality of multimedia asset data files; and generating from the plurality of multimedia asset data files a set of multimedia application asset files compatible for proper use in a multimedia application deployed on an installation platform based on the identifying information.

2. The method of claim 1 wherein storing identifying information includes:

prompting a user for asset information for at least one of the plurality of multimedia asset data files;

receiving the asset information; and storing the asset information with the identifying information associated with the at least one of the plurality of multimedia asset data files.

3. The method of claim 2 wherein the asset information includes:

an asset source field;

an asset copyright field; and an asset format field.

4. The method of claim 1 wherein storing identifying information includes:

determining a project number;

determining a version number; and determining an installation platform.

5. In an application development computer system, a system for automatically managing multimedia assets for use in a multimedia application requiring compatible versions of the multimedia assets for proper deployment on different installation platforms, the system comprising:

a memory for storing a plurality of multimedia asset data files, wherein the plurality of multimedia asset data files include asset concepts, asset comparables, and asset instances; and a processor operable with the memory for automatically categorizing each one of the plurality of multimedia asset data files as an asset concept, an asset comparable, or an asset instance, the processor being further operable to assign an asset concept identifier which includes a unique identifier and a concept description to each asset concept, an asset comparable identifier which includes a unique identifier and a concept variation description to each asset comparable, and an asset instance identifier which includes a unique identifier, the associated asset concept identifier, and the associated asset comparable identifier to each asset instance;

wherein said memory stores identifying information including the asset concept identifiers, the asset comparable identifiers, and the asset instance identifiers associated with each one of the plurality of multimedia asset data files and said processor generates from the plurality of multimedia asset data files which are stored in the memory a set of multimedia application asset files compatible for use in a multimedia application deployed on an installation platform based on the identifying information.

6. The system of claim 5 further comprising an output device operable with the processor for prompting a user for asset information for at least one of the plurality of multimedia asset data files, and an input device operable with the processor for receiving the asset information and for storing the asset information in the memory with the identifying information associated with the at least one of the plurality of multimedia asset data files.

7. The system of claim 6 wherein the asset information includes:

an asset source field;

an asset copyright field; and an asset format field.

8. The system of claim 5 wherein the processor is further operable for determining a project number, a version number, and an installation platform.

\* \* \* \* \*